United States Patent [19]

Stove

[11] Patent Number: 5,516,295

[45] Date of Patent: May 14, 1996

[54] SIMULATION ARRANGEMENT

[75] Inventor: Andrew G. Stove, Reigate, England

[73] Assignee: U.S. Philips Corporation, New York, N.Y.

[21] Appl. No.: 233,912

[22] Filed: Apr. 28, 1994

[30] Foreign Application Priority Data

Apr. 27, 1993 [GB] United Kingdom .................. 9308658

[51] Int. Cl.[6] ..................................................... G09B 9/05
[52] U.S. Cl. ............................................ 434/63; 434/38
[58] Field of Search ................................. 434/69, 63, 64, 434/65, 68, 38, 62

[56] References Cited

U.S. PATENT DOCUMENTS

| | | | |
|---|---|---|---|
| 4,368,489 | 11/1984 | Copperman et al. | 434/69 |
| 4,750,888 | 6/1988 | Allard et al. | 434/69 |
| 4,868,771 | 9/1989 | Quick et al. | 434/69 |
| 4,952,152 | 8/1990 | Briggs et al. | 434/69 |
| 5,015,188 | 5/1991 | Pellosie, Jr. et al. | 434/38 |
| 5,228,856 | 7/1993 | Chang et al. | 434/69 |
| 5,240,416 | 8/1993 | Bennington | 434/66 |
| 5,275,565 | 1/1994 | Moncrief | 434/69 |
| 5,320,538 | 6/1994 | Baum | 434/69 |
| 5,366,376 | 11/1994 | Copperman et al. | 434/69 |

OTHER PUBLICATIONS

"Computer Graphics Principles and Practice" Foley et al., published by Addison–Wesley, pp. 253–271.

"Gids Small World Simulation" Chapter 9, In Generic Intelligent Driver Support Winsum et al.

*Primary Examiner*—Paul J. Hirsch
*Attorney, Agent, or Firm*—Steven R. Biren

[57] ABSTRACT

A vehicle simulator is provided with a control device for actuation by an operator which device's input is digitized and fed to a vehicle model. The model (14) maintains an objective position and direction for the simulated vehicle which are fed to a lag means. The lag means operates to delay the rate of change of objective direction of the simulated vehicle to provide a subjective direction to a display generator. The display generator provides a subjective view based on the objective position and subjective direction of the simulated vehicle on a display.

16 Claims, 2 Drawing Sheets

100 # SIMULATION ARRANGEMENT

BACKGROUND OF THE INVENTION

The present invention relates to a simulation arrangement and more particularly to a fixed-bed vehicle simulation arrangement in which the operator is not physically moved around by the arrangement.

Fixed bed simulators for training and entertainment purposes such as flight simulators and video games for driving are available at a variety of levels of sophistication. The crudest simulators provide the operator with a view from the vehicle which is merely translated in space relative to the previous view. More sophisticated simulators such as that described in Van Winsum, W., "GIDS Small World Simulation" Chapter 9 in Michon, J. A., "Generic Intelligent Driver Support", Taylor and Francis, London also rotate the view to provide the operator with an objective view from the simulated vehicle. Such simulators provide a much more realistic output to the operator than the crudest types of simulator. However, they are not as realistic (or as expensive) as a full simulator which moves the operator around.

One difficulty that has arisen in the development of a fixed-bed simulator which both rotates and translates the view provided to the operator is that the operator sees a situation that does not correspond to what he feels. This anomaly can cause feelings of nausea in the operator.

It is an object of the present invention to provide a fixed-bed simulation arrangement which results in reduced feelings of nausea in the operator.

SUMMARY OF THE INVENTION

According to the present invention there is provided a vehicle simulation arrangement comprising display means for displaying a view from a simulated vehicle to an operator, at least one control device for actuation by an operator, means responsive to the at least one control device for maintaining an objective direction of the simulated vehicle, characterized in that lag means are provided for delaying the objective direction of the simulated vehicle before it is applied to the means for displaying a view from the simulated vehicle.

The provision of a delay between the objective direction of the simulated vehicle and the direction of view actually provided to the operator means that the simulation apparatus does not always show the operator a view looking along the vehicle axis as is done in known systems and this is found to be less nausea-inducing. A simulation apparatus in accordance with the invention has also been found to be easier to control.

In order to generate the view to be shown to the operator, two pieces of information are required. These are firstly the calculated position of the vehicle within the simulator's model of the world, and secondly the direction in which the vehicle is pointing. The crude simulators discussed above ignore the direction information completely while the more sophisticated simulators rotate the view to take account of vehicle direction. In the real world, however, or on a moving bed simulator, the driver senses when he is turning and unconsciously turns his eyes to tend to stabilize his direction of view, even when his body is turned. The problem with sophisticated fixed-bed simulators is that part of the sensation of motion is lost and the unconscious stabilization process cannot work so the field of view appears to change more than it would if the cues which help stabilization were present.

In the present invention, the perceived change of direction lags relative to the objective direction, and the time constant of the lag is a measure of how quickly the change of direction is perceived. The perceived change of direction is due, in the real world, to imperfection in the eye's stabilization. The eye's stabilization system may be assumed to act as a simple lag, with a time constant of 100 ms. The turning of the eye therefore lags the objective change in direction by this amount. The perceived change of direction is the difference between the turning of the eye and the objective change of direction. Values used in the simulator may be between, for example 0.05 and 0.25 seconds. The lag means may include differentiation means for providing a view to the display means which is rotated by an amount proportional to the rate of change of objective direction of the simulated vehicle.

For sharp turns of the simulated vehicle, the difference between the objective view and the view provided to the operator may be too great for the simulation to be realistic. To overcome this difficulty a non-linear transfer function may be used whereby for small changes in direction the view direction lags the objective change of direction, but for large changes the full change is passed to the display generator.

Alternatively, where a simulated car is driven on a track, for example, the simulation apparatus may include means to provide a particular course around sharp corners and only the objective vehicle's deviations from this course are applied to the differentiator means and thence to the operator.

The location model of the simulator may conveniently be stored as a series of small blocks. These may be arranged as a standard library of blocks and a sequence listing the order in which the blocks are to be called up.

BRIEF DESCRIPTION OF THE DRAWING

The present invention will now be described, by way of example, with reference to the accompanying drawing, in which.

DESCRIPTION OF THE PREFERRED EMBODIMENTS

Figure 1:
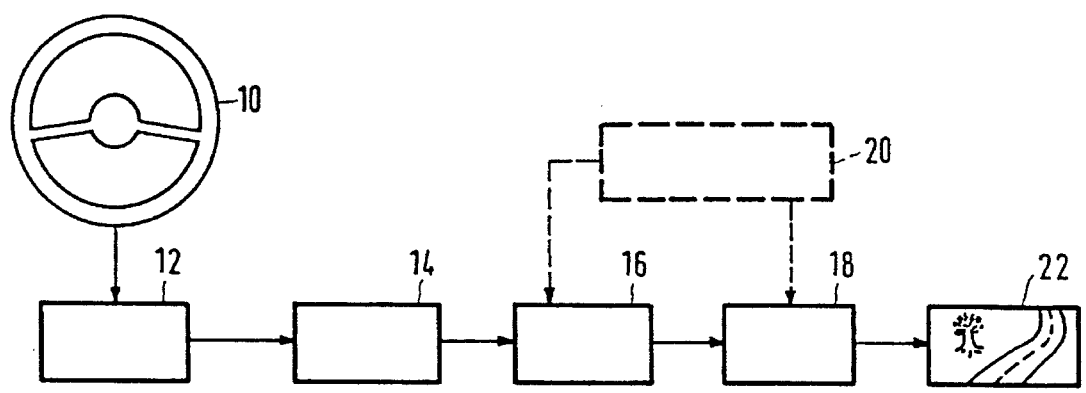
FIG. 1 shows a block schematic diagram of a simulation apparatus in accordance with the present invention.

Refering to FIG. 1, the simulation apparatus, for example a car simulator, has one or more controls for actuation by the operator, in this case a steering wheel 10. The steering wheel is arranged to rotate a potentiometer which is connected to an analog to digital converter (A/D) 12. Other techniques for measuring the position of the steering wheel such as optical or magnetic shaft encoders could be used instead. The A/D 12 provides a digital output which is connected to a model 14 of the vehicle. The model of vehicle behavior is arranged in conventional manner to provide position and direction information according to the characteristics of the simulated vehicle and the operator's use of the controls. Instead of applying an output of the model 14 to a display or display generator, that output is connected to a lag means 16. The lag means 16 includes a differentiator for providing a view to the display means which is rotated by an amount proportional to the rate of change of objective direction of the simulated vehicle. The rate of change of vehicle direction provided at the output of the model 14 determines the amount of change of direction to the subjective vehicle position. If a large rate of change of direction is applied to the means 16 by virtue of the operator turning the steering wheel 10 sharply, a greater direction change is applied to the display. Thus, the display of a sharp turn to the operator will show as a greater change of direction than a more gentle turn and vice versa. A differentiator having a time constant of 100 ms has been found to give good results.

The output of the means 16 is connected to a display generator 18 which derives the operator's view from the vehicle from the position information in a conventional manner and provides the view to the display 22. Because of the inclusion of the means 16, the view provided to the operator on the display 22 will differ from the objective axis of the vehicle during and after turning. For simplicity only a steering wheel 10 has been shown and described but it will be understood that the simulation may also comprise a throttle and brake in the manner of known car simulators or more sophisticated controls in the case of a flight simulator and so on.

The display generator 18 is optionally connected to a location model 20 which provides details of a racetrack or other simulated environment in which the vehicle is being operated. The location model 20 may also be connected to the lag means 16 to provide a predetermined course around sharp corners. This predetermined course is subtracted from the objective course and the difference processed by the lag means.

Figure 2:
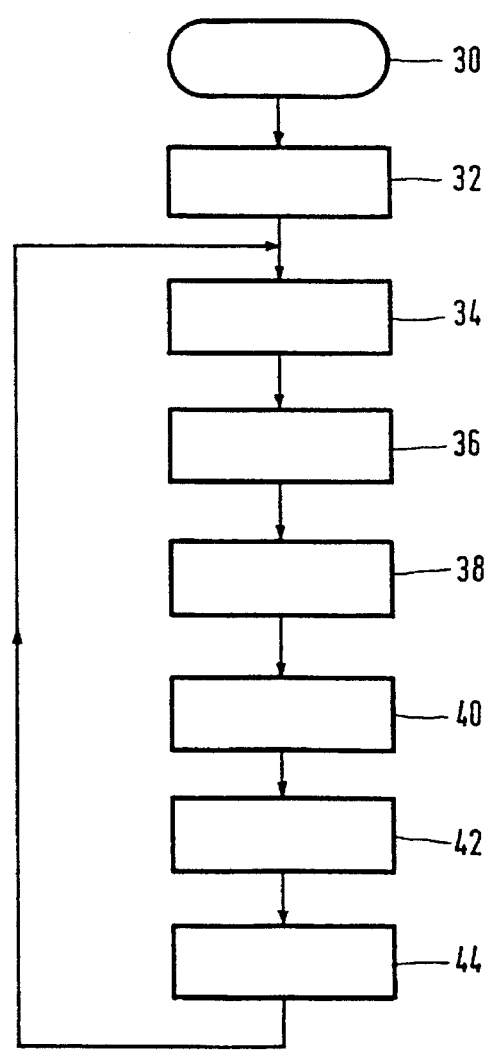
FIG. 2 shows a flow chart for the operation of a simulation apparatus.

The models 14, 20, the lag means 16 and the display generator 18 may conveniently be implemented by a programmed microprocessor arranged to execute the program steps illustrated in FIG. 2.

The flow chart steps have the following functions:
30—start
32—set elapsed time to zero
34—read input from operator's controls
36—apply time elapsed and current position to vehicle model
38—derive rate of change of direction term proportional to rate of objective vehicle turning
40—derive subjective direction of view from vehicle from rate of change of direction term and eye stabilization lag
42—display subjective view from vehicle
44—increment elapsed time This second embodiment of the invention operates in a similar manner to the first embodiment to provide the operator with a view from the vehicle whose direction lags by an amount according to the rate of change of objective vehicle turning.

The location model, or image which the operator of the simulation apparatus sees, may be provided in the following manner which is particularly suitable for implementing on a microprocessor which has limited processing speed or limited memory, such as a personal computer.

Figure 3:
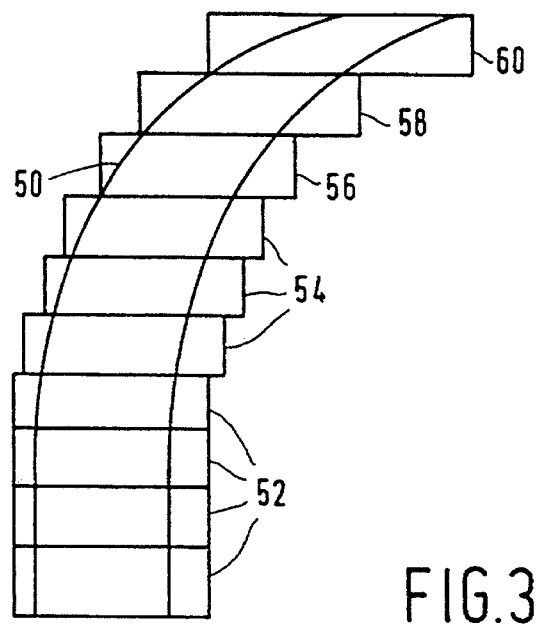
FIG. 3 shows a diagrammatic view of the storage of a road in the simulation apparatus.

FIG. 3 shows a plan view of a portion of a road 50 upon which the simulated vehicle is to be driven and this road is shown divided into 10 blocks 52, 54, 56, 58 and 60. The same numbered blocks represent the same road pattern. The road 50 may be stored as a number of individual blocks or as a library of standard blocks and a sequence of reference numbers which specify the order in which blocks are selected from the library of standard blocks. The former option allows greater freedom of design and may be marginally faster but the latter will generally save a large amount of storage space with a minimal sacrifice of flexibility. In use the standard blocks may be retrieved simply by specifying their reference number. Thus a large road layout or racetrack may be stored as a number of short identity codes. The road layout within the blocks may be stored as a number of pixel values for the left and right of the road or as a value for one side of the road and a width measurement. To ensure that the road matches up with that of an adjacent block, an offset value may be included in each block which is applied to displace the following block relative to it. While ten blocks are shown in the figure, in practice a larger number of the order of 50 or more will be used to provide a reasonable level of realism. Each block will then represent of the order of a meter of actual road. For increased realism blocks relating to approximately 10 cm of actual road may be used.

Figure 4:
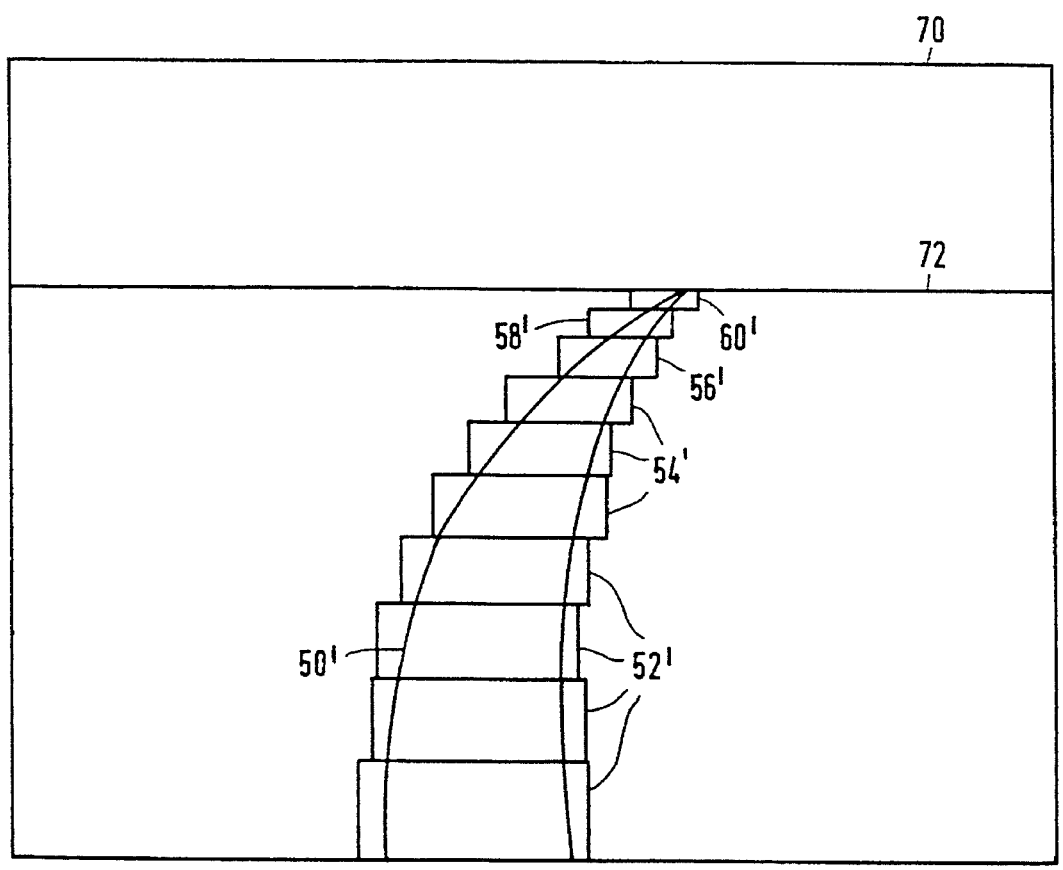
FIG. 4 shows the view of FIG. 3 transformed into a perspective view from the simulated vehicle.

To provide a perspective view of the road to an operator of the simulation apparatus, the following transformation is performed. The identity numbers of the relevant blocks for the present position of the vehicle are read out and their respective layout data is retrieved. The closest block will be displayed in the greatest detail and the furthest block will displayed in the least detail, typically as a single line of pixels on the screen only. The relation between the plan of each block and the image on the screen thus depends upon the distance of the block from the simulated vehicle. There now exists the possibility of a tradeoff between processing power and amount of memory available to the processor. If processing power is limited but memory is relatively plentiful the image of the road ahead for each block may instead be stored as a number of perspective views dependent upon the distance from the simulated vehicle. The relevant view for that portion of the road is then simply recalled on the basis of distance from the simulated vehicle. If memory is more limited, however, the perspective views can be derived from the plan views using simple interpolation techniques and narrowing of the road as it approaches the vanishing point in the distance. In either case the result should be as shown in FIG. 4 where the perspective view 50' of the road is displayed on a screen 70 and vanishes at the horizon 72. The blocks are labelled with primed numbers which correspond to those in FIG. 3. The four blocks of road labelled 52' nearest the operator thus become progressively shorter and narrower as their distance from the simulated vehicle increases. The blocks of the perspective road 50' that are still further away are shorter and narrower. To derive the perspective version of a block from the plan view version it is sufficient to shorten and narrow the block dependent upon the distance from the simulated vehicle but for improved realism when sufficient processing power is available, more sophisticated transforms may be used as are known in the simulator art, for example from 'Computer Graphics Principles and Practice' by Foley, van Dam, Feiner and Hughes and published by Addison-Wesley. Where the simulator provides a predetermined course along the road from which the perceived direction of view is derived, this may conveniently be stored in the location model blocks.

Next the heading of the simulated vehicle on the road is derived from the vehicle model, for example from the past heading of the vehicle, the position of the operator's steering wheel and any other factors such as wheel slip which depend upon the sophistication of the simulator. The direction in which the road ahead is pointing (in other words since the operator is inside the simulated vehicle, it is the road that is seen to move when the vehicle turns) is then derived and displayed. To conserve computing power it is possible to adjust the direction of the road on the screen using a shear transform provided in the display hardware where such a transform is available. Similarly, the horizontal location of the road relative to the vehicle may be adjusted by a linear transformation or left-right hardware scroll. The simulation then repeats these steps to derive the next view to ve provided to the operator.

While a car simulation apparatus has been described it will be understood that the invention may be applied to simulators for aeroplanes, boats, motorcycles and so on. Where a simulator in accordance with the invention is used to simulate an aeroplane or other vehicle which has freedom to move up and down as well as left to right, a lag may also be applied to changes of elevation angle as well as changes of heading.

From reading the present disclosure other modifications will be apparent to persons skilled in the art. Such modifications may involve other features which are already known in the design, manufacture and use of vehicle simulators and component parts thereof and which may be used instead of or in addition to features already described herein.

What is claimed is:

1. A vehicle simulation arrangement comprising display means for displaying a view from a simulated vehicle to an operator, and at least one control device for actuation by an operator, and means responsive to the at least one control device for maintaining an objective direction of the simulated vehicle, characterized in that lag means are provided for delaying the objective direction of the simulated vehicle before it is applied to the means for displaying a view from the simulated vehicle.

2. A simulation apparatus as claimed in claim 1, wherein the lag means has a time constant of between 0.05 and 0.5 seconds.

3. A simulation apparatus as claimed in claim 1, wherein the lag means includes differentiation means for providing a view to the display means which is rotated by an amount proportional to the rate of change of objective direction of the simulated vehicle.

4. A simulation apparatus as claimed in claim 1, further comprising means for providing a predetermined course and means for subtracting the predetermined course from the objective course to provide a difference course to the lag means.

5. A simulation apparatus as claimed in claim 1, further comprising means for storing a plurality of location model blocks arranged for display in sequence.

6. A simulation arrangement as claimed in claim 1, further comprising means for storing a plurality of location model library blocks, means for storing at least one sequence of library blocks and means for reading library blocks in accordance with the stored sequence.

7. A simulation arrangement as claimed in claim 5, wherein the location model blocks comprise a plan representation of the location model, the arrangement further comprising transform means for converting the representation of the location model to a view from the simulated vehicle.

8. A simulation arrangement as claimed in claim 5, wherein each of the location model blocks contains at least one representation of the location model as viewed from the simulated vehicle.

9. A simulation arrangement as claimed in claim 8, wherein each of the location model blocks contains a plurality of representations of the location model at different distances as viewed from the simulated vehicle.

10. A simulation apparatus as claimed in claim 2, wherein the lag means includes differential means for providing a view to the display means which is rotated by an amount proportional to the rate of change of objective direction of the simulated vehicle.

11. A simulation apparatus as claimed in claim 2, further comprising means for providing a predetermined course and means for subtracting the predetermined course from the objective course to provide a difference course to the lag means.

12. A simulation apparatus as claimed in claim 3, further comprising means for providing a predetermined course and means for subtracting the predetermined course from the objective course to provide a difference course to the lag means.

13. A simulation apparatus as claimed in claim 2, further comprising means for storing a plurality of location model blocks arranged for display in sequence.

14. A simulation arrangement as claimed in claim 2, further comprising means for storing a plurality of location model library blocks, means for storing at least one sequence of library blocks and means for reading library blocks in accordance with the stored sequence.

15. A simulation arrangement as claimed in claim 6, wherein the location model blocks comprise a plan representation of the location model, the arrangement further comprising transform means for converting the representation of the location model to a view from the simulated vehicle.

16. A simulation arrangement as claimed in claim 6, wherein each of the location model blocks contains at least one representation of the location model as viewed from the simulated vehicle.

* * * * *